(12) United States Patent
Antalek et al.

(10) Patent No.: US 8,378,535 B2
(45) Date of Patent: Feb. 19, 2013

(54) SCAVENGING FILTER SYSTEM FOR HYDROGEN-COOLED DYNAMOELECTRIC MACHINES

(75) Inventors: James Daniel Antalek, Valatie, NY (US); Steven Paul Scarlata, Wynantskill, NY (US); Fotios Raftelis, Albany, NY (US)

(73) Assignee: General Electric Company, Schenectady, NY (US)

( * ) Notice: Subject to any disclaimer, the term of this patent is extended or adjusted under 35 U.S.C. 154(b) by 420 days.

(21) Appl. No.: 12/713,507

(22) Filed: Feb. 26, 2010

(65) Prior Publication Data

US 2011/0210629 A1 Sep. 1, 2011

(51) Int. Cl.
*H02K 9/10* (2006.01)
*H02K 9/26* (2006.01)
(52) U.S. Cl. ............. 310/56; 310/52; 310/60 R
(58) Field of Classification Search .......... 310/56, 310/52, 60 R; *H02K 9/10, 9/12, 9/19, 9/26*
See application file for complete search history.

(56) References Cited

U.S. PATENT DOCUMENTS

| | | | |
|---|---|---|---|
| 3,916,671 A | 11/1975 | Carson et al. | |
| 4,231,768 A * | 11/1980 | Seibert et al. | 96/128 |
| 4,531,070 A * | 7/1985 | Kuhn | 310/56 |
| 6,126,726 A | 10/2000 | Foley, Jr. et al. | |
| 6,959,585 B2 * | 11/2005 | Brosnihan et al. | 310/56 |
| 7,550,113 B2 | 6/2009 | Speranza et al. | |
| 7,552,622 B2 | 6/2009 | Speranza | |
| 2007/0244601 A1 | 10/2007 | Speranza | |
| 2009/0211920 A1 | 8/2009 | Speranza et al. | |

FOREIGN PATENT DOCUMENTS

| | | |
|---|---|---|
| EP | 1580868 A1 | 9/2005 |
| JP | 59216441 A | 12/1984 |
| JP | 05097403 A | 4/1993 |

\* cited by examiner

*Primary Examiner* — Tran Nguyen
*Assistant Examiner* — Michael Andrews
(74) *Attorney, Agent, or Firm* — James W. Pemrick; Ernest G. Cusick; Frank A. Landgraff

(57) ABSTRACT

A filter system is provided for a hydrogen cooled dynamoelectric machine, and includes a float trap fluidly connected to a component of the dynamoelectric machine via a first conduit, a filter fluidly connected to the float trap via a second conduit, and a flow switch fluidly connected to the filter via a third conduit. The third conduit is fluidly connected to a hydrogen control assembly.

17 Claims, 4 Drawing Sheets

SCAVENGING FILTER SYSTEM FOR HYDROGEN-COOLED DYNAMOELECTRIC MACHINES

BACKGROUND OF THE INVENTION

The present invention relates generally to the art of hydrogen cooled generators and, more particularly, to a filter system for a hydrogen cooled generator.

Some power plant systems, for example certain nuclear, simple cycle and combined cycle power plant systems, employ hydrogen as a coolant for generators, which, during operation, produce large amounts of heat. Hydrogen's high heat capacity, low density and ability to reduce windage losses improves the output of the electric generator and the efficiency of the overall system. These properties make it desirable to maintain a high level of hydrogen purity within the generator. However, maintaining purity of the hydrogen in these generators is typically costly. Some power plant systems remove hydrogen via a scavenging system that extracts a portion of a mixture of gases from within the generator or drain enlargements, vents the portion of a mixture of gases to the ambient and replaces it with clean hydrogen.

Hydrogen cooled generators often include a seal oil or lubricant drain system that includes a detraining tank. The detraining tank allows any entrained hydrogen to escape from the lubricant. After the hydrogen is removed, the lubricant is re-introduced to the generator. In operation, the lubricant flows along rotating components of the generator and picks up hydrogen before passing into the detraining tank. In the detraining tank, the hydrogen escapes or rises from the lubricant. The lubricant accumulates and eventually flows over a standpipe and passes towards a recycling tank.

Hydrogen is circulated through the generator for cooling, and this hydrogen can pick up various contaminants that can reduce its purity levels. In some cases detrained hydrogen may also be recycled and reintroduced into the generator, and this hydrogen can also become contaminated. It is desirable to maintain a high purity level of hydrogen, and typically this purity level is measured by a hydrogen sensing system. If the purity level drops below a desired threshold, some hydrogen may be purged and clean hydrogen added to bring the overall purity level back into the desired range.

Hydrogen samples are typically obtained from various parts of the generator. For example, samples from the high and low pressure areas of the generator and the detraining tanks may be obtained. The sampling devices used are highly sensitive devices that can be easily contaminated by non-hydrogen elements in the gas stream. For example, lubricant may be present in gaseous or liquid form in the hydrogen sample. This lubricant can contaminate the hydrogen sensors and render them inaccurate or inoperable.

BRIEF DESCRIPTION OF THE INVENTION

A first aspect of the present invention provides a filter system for a hydrogen cooled dynamoelectric machine, and includes a float trap fluidly connected to a component of the dynamoelectric machine via a first conduit, a filter fluidly connected to the float trap via a second conduit, and a flow switch fluidly connected to the filter via a third conduit. The third conduit is fluidly connected to a hydrogen control assembly.

A second aspect of the present invention provides a hydrogen cooled dynamoelectric machine having a filter system. The filter system includes a float trap fluidly connected to a component of the dynamoelectric machine via a first conduit, a filter fluidly connected to the float trap via a second conduit, and a flow switch fluidly connected to the filter via a third conduit. The third conduit is fluidly connected to a hydrogen control assembly.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

Figure 1:
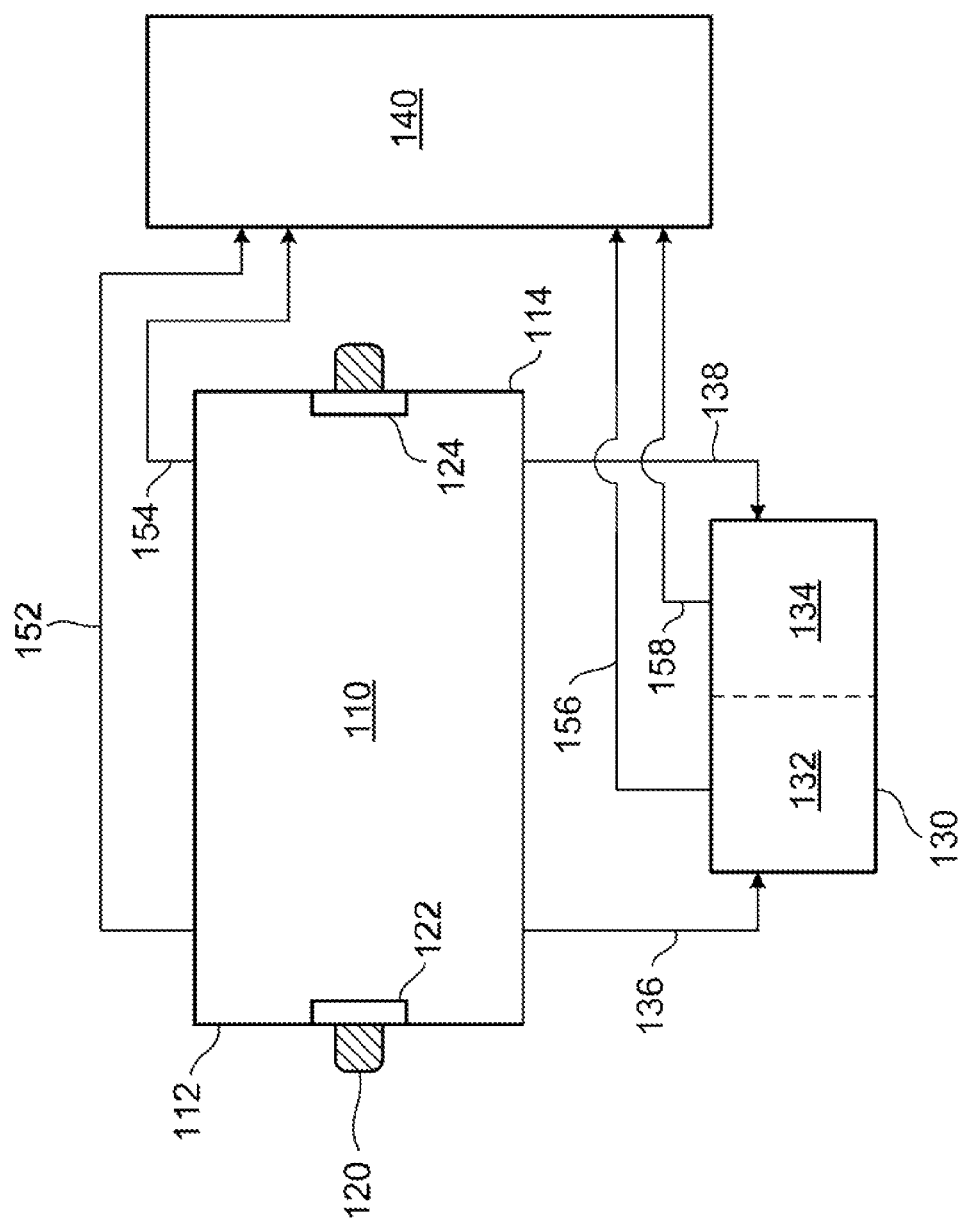
FIG. 1 is a simplified schematic illustration of a dynamoelectric machine system.

With reference to FIG. 1, a hydrogen cooled generator 110 includes a rotating shaft 120 including a first or turbine end 112 and a second or collector end 114. Turbine end 114 includes a first seal 122 while collector end 114 includes a second seal 124. First and second seals 122 and 124 require lubricant such as seal oil, which is passed to a drain system in a manner that will be discussed more fully below. The seal oil reduces hydrogen gas escaping from generator 110 particularly in a region about first and second seals 122 and 124. In the exemplary embodiment shown, hydrogen cooled generator 110 includes a drain system that includes a seal oil drain enlargement 130. The seal oil drain enlargement (SODE) 130 may comprise a long horizontal length of pipe or a tank, which provides a large surface area serving for detraining hydrogen from the oil before it exits the seal oil drain enlargement system. There may be separate chambers in the SODE 130, for example, a turbine end SODE 132 for the turbine end seal 122 and a collector end SODE 134 for the collector or coil end seal 124. The SODE 130 is fluidly coupled to the first and second seals 122, 124 via conduits 136 and 138.

A hydrogen control assembly 140 performs the function of monitoring the gas mixtures within the generator 110 and the SODE 130. The gas mixture compositions may be provided in volumetric percentages for mixtures of Air/CO2, $CO_2/H_2$, $H_2$/Air, and any other desired gas or gas mixture. The monitoring of a hydrogen or $H_2$/Air composition can be used during normal operation of the generator 110. The hydrogen control assembly 140 provides a means of setting the continuous scavenging rate of gas from the SODE 130, as well as a means of increasing the scavenging rate in order to raise the purity level of hydrogen in the SODE 130 and/or generator 110. Scavenging from the SODE 130 rather than the generator can reduce the amount of scavenging required to maintain the desired purity level of hydrogen in the generator 110.

Various conduits or pipes are routed from the SODE 130 and the generator 110 to enable sampling of gaseous mixtures. Conduit 152 is connected from the generator (e.g., the high pressure side) to an input of the hydrogen control assembly 140. Conduit 154 is connected from the generator (e.g., the low pressure side) to another input of the hydrogen control assembly 140. Conduit 156 is connected from the turbine end SODE 132 to an input of the hydrogen control assembly 140, while conduit 158 is connected from the collector end SODE 134 to an input of the hydrogen control assembly 140. All of these conduits transport gas or gas mixtures from various components of the generator system to the hydrogen control assembly 140 for sampling and/or analysis.

Figure 2:
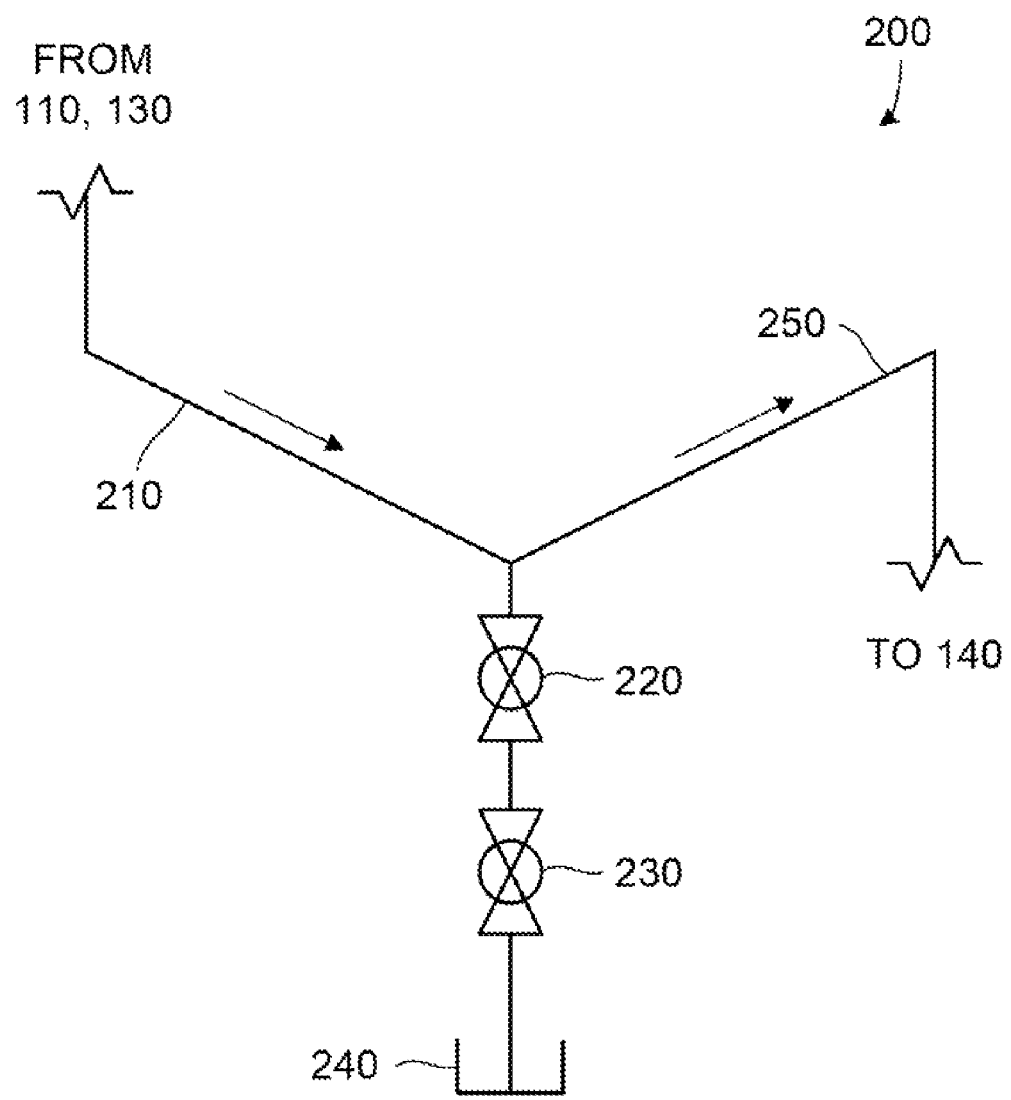
FIG. 2 is a schematic illustration of one known drip leg that can be utilized with the dynamoelectric machine system of FIG. 1.

FIG. 2 illustrates one known drip leg arrangement 200 that is used to remove liquid lubricant (e.g., oil) from the gas sampling stream. Typically, the drip leg arrangement 200 is placed between the sampling site (e.g., SODE 130 and/or generator 110) and the hydrogen control assembly 140. The drip leg assembly 200 includes a downwardly sloped conduit 210 that leads to one or more valves 220, 230. The valves 220, 230 empty into a drain 240. An upwardly sloped conduit 250 is routed to an input of the hydrogen control assembly 140. The slope of the conduits 210 and 250 are important as lubricant hopefully drains (with the help of gravity) to the lower portions of the drip leg arrangement, and this lubricant can be removed by actuation of valves 220, 230. However, due to pressures within various parts of the generator, or due to other issues, liquid and/or atomized lubricant can fill conduits 210, 250 and eventually enter hydrogen control assembly 140. This lubricant can damage the sensors within the hydrogen control assembly and trigger a shutdown of the generator.

Figure 3:
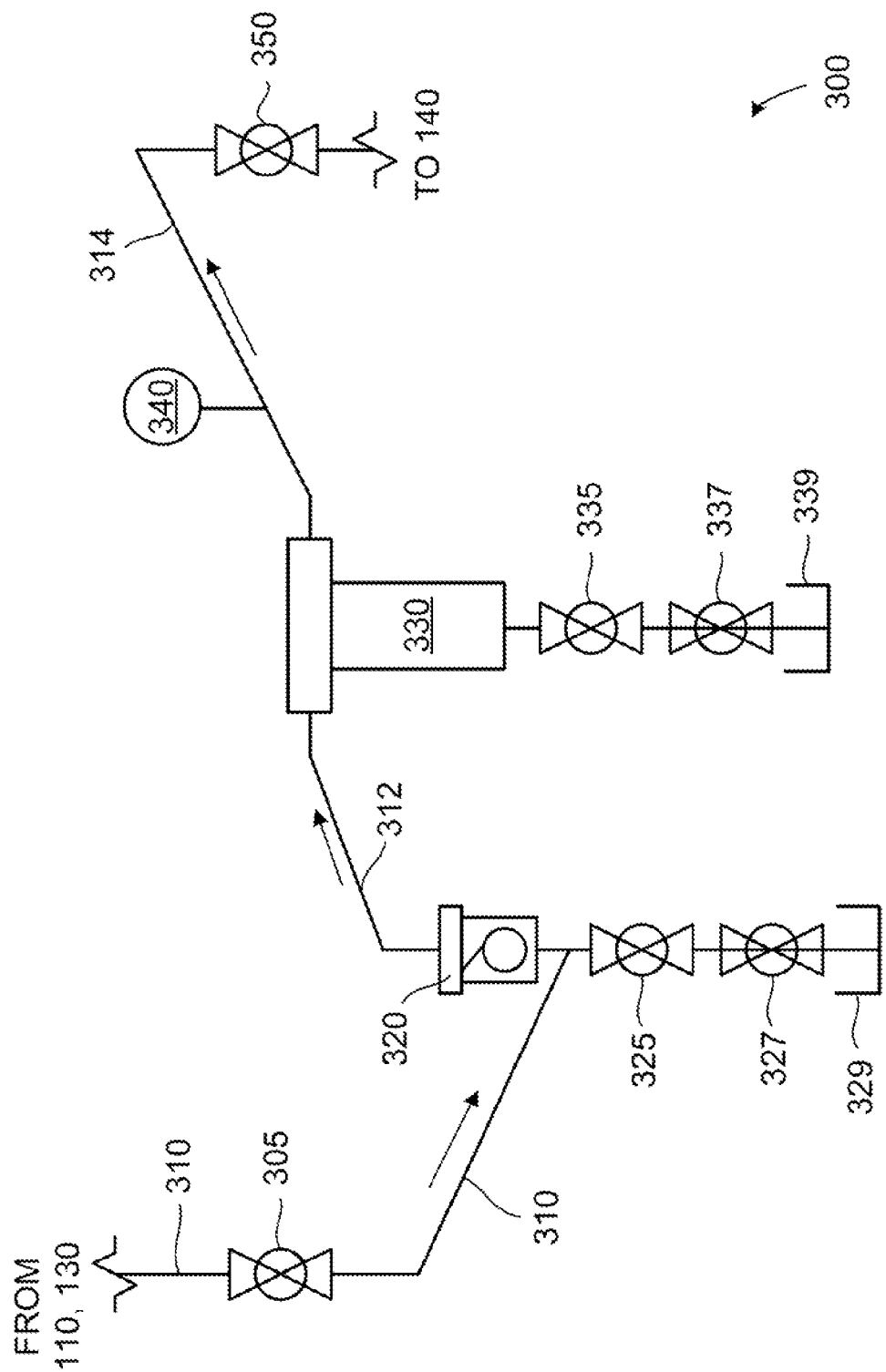
FIG. 3 is a schematic illustration of a filter system that can be used with the dynamoelectric machine system of FIG. 1, according to an aspect of the present invention.

FIG. 3 illustrates a filter system 300 according to an aspect of the present invention. The filter system 300 replaces the drip leg arrangement 200 of the prior art and may be placed between the SODE 130 or generator 110 and the hydrogen control assembly 140. For example, the filter system 300 could be placed in line with conduits 152, 154, 156, 158 or anywhere else desired for the specific application to filter between the generator or generator components and the hydrogen control assembly 140.

The filter system 300 includes a valve 305, conduit 310, float trap 320, valves 325, 327, drain 329, conduit 312, filter 330, valves 335, 337, drain 339, conduit 314, flow switch 340 and valve 350. The input to the filter system 300 begins with conduit 310, which includes valve 305, and can be connected to the SODE 130 or generator 110. Alternatively, the input to the filter system can be connected to any desired element in the generator system. Conduit 310 is preferably sloped downwardly to float trap 320. The float trap 320 permits gaseous flows to pass but limits fluid or liquid flows. Hydrogen or other gaseous mixtures can pass through float trap 320. However, if there was a constant or substantial flow of oil (e.g., in liquid form) through conduit 310, the float trap 320 would close and prevent further flow of liquid from reaching filter 330, flow switch 340 and hydrogen control assembly 140. The valves 325 and 327 can be of the ball valve type (or any other suitable type of valve), and may be configured to be normally open and/or normally closed. The drain 329 can be configured as an isolated reservoir, a drain back to the lubricant tank or routed to a disposal site.

Conduit 312 leads from the float trap 320 to an input of a filter 330. Preferably, the filter 330 is a coalescing type filter, however, any suitable type of filter can be used as desired in the specific application. The coalescing type filter enables any oil or oil mist to coalesce and drain down to valves 335 and 337. The valves 335 and 337 can be of the ball valve type (or any other suitable type of valve), and may be configured to be normally open and/or normally closed. The drain 339 can be configured as an isolated reservoir, a drain back to the lubricant tank or routed to a disposal site.

Conduit 314 leads out of filter 330 and is input to valve 350 which is connected before the input to the hydrogen control assembly 140. A flow switch 340 is connected to conduit 340 and functions to monitor the flow through conduit 314. In the event of a blockage or flow interruption (e.g., float trap 320 is closed by excessive oil flow), the flow switch 340 can be used to signal an alarm to indicate that system maintenance is required.

Figure 4:
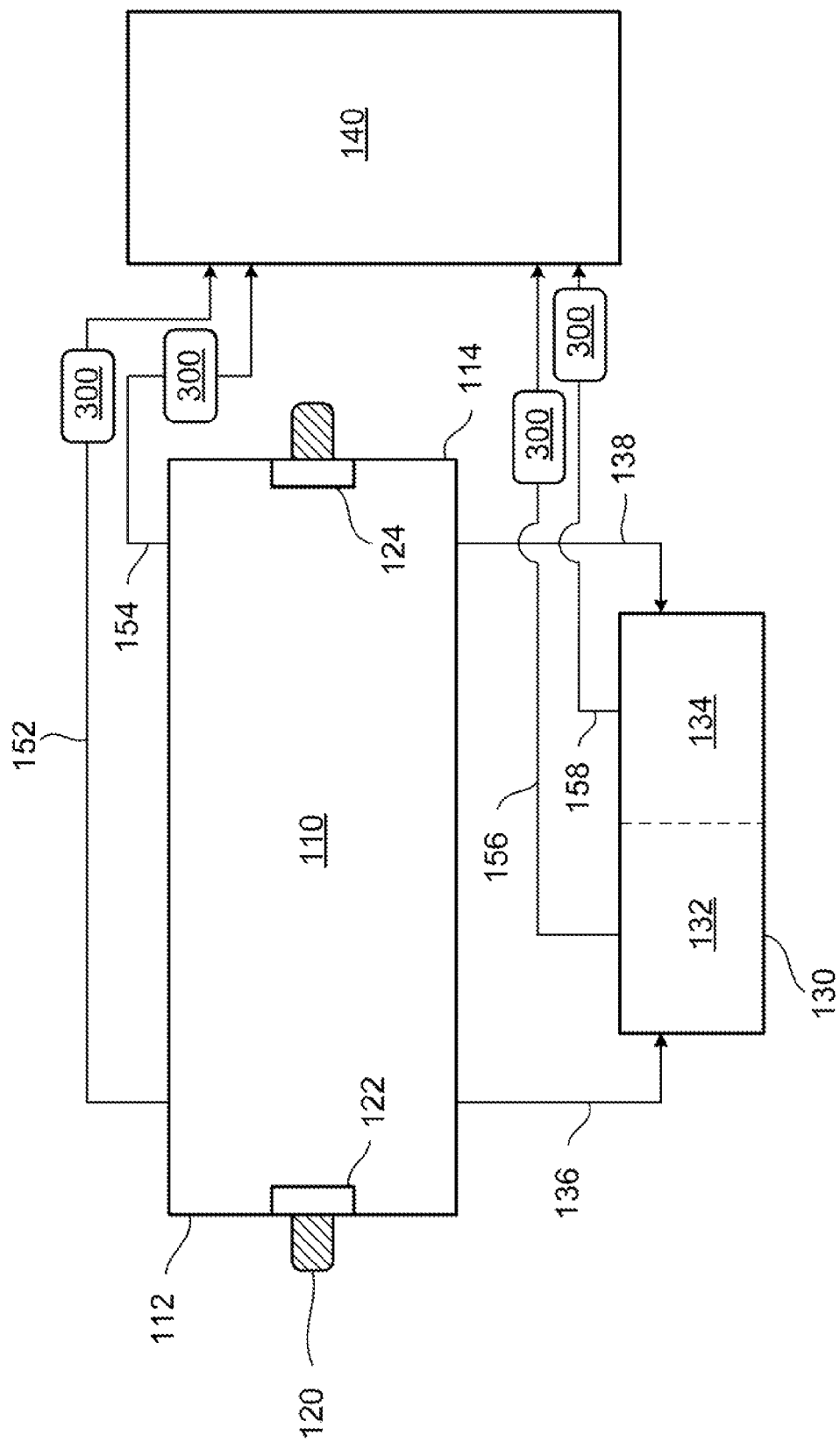
FIG. 4 is a schematic illustration of a dynamoelectric machine system incorporating the filter system of FIG. 3, according to an aspect of the present invention.

Referring to FIG. 4, the filter system 300, according to aspects of the present invention, can be placed anywhere it may be desired to limit the flow of unwanted amounts of liquid lubricant. For example, the filter system could be placed between the SODE 130 and the hydrogen control assembly 140. If the filter 300 was placed between the turbine end SODE 132 and the hydrogen control assembly, it could be placed inline with conduit 156. If the filter 300 was placed between the collector end SODE 134 and the hydrogen control assembly, it could be placed inline with conduit 158.

The filter system 300 could also be placed between the high pressure side of the generator 110 and the hydrogen control assembly 140, and in this case would be placed inline with conduit 152. Similarly, The filter system 300 could be placed between the low pressure side of the generator 110 and the hydrogen control assembly 140, and in this case would be placed inline with conduit 154.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A filter system for a hydrogen cooled dynamoelectric machine, the filter system comprising:
   a float trap fluidly connected to a component of the dynamoelectric machine via a first conduit,
   a coalescing filter fluidly connected to the float trap via a second conduit,
   a flow switch fluidly connected to the filter via a third conduit,
   wherein the third conduit is fluidly connected to a hydrogen control assembly, and
   wherein the hydrogen control assembly monitors gas mixtures within the dynamoelectric machine, and based on monitored gas mixture results the hydrogen control assembly provides a means for setting a scavenging rate of gas from the component.

2. The filter system of claim 1, wherein the float trap is configured to limit fluid flow through the second conduit if a predetermined amount of fluid enters the float trap.

3. The filter system of claim 2, the fluid comprising oil.

4. The filter system of claim 2, further comprising at least one valve fluidly connected to the float trap and a drain.

5. The filter system of claim 1, further comprising a valve connected between the component of the dynamoelectric machine and the hydrogen control assembly.

6. The filter system of claim 5, wherein the component of the dynamoelectric machine is chosen from at least one of the group comprising:
a generator and a seal oil drain enlargement.

7. The filter system of claim 1, further comprising a valve connected between the filter and the hydrogen control assembly.

8. The filter system of claim 1, wherein the dynamoelectric machine is at least one of a generator and a motor.

9. The filter system of claim 8, wherein the component of the dynamoelectric machine is chosen from at least one of the group comprising:
a generator and a seal oil drain enlargement.

10. A hydrogen cooled dynamoelectric machine having a filter system, the filter system comprising:
a float trap fluidly connected to a component of the dynamoelectric machine via a first conduit,
a coalescing filter fluidly connected to the float trap via a second conduit,
a flow switch fluidly connected to the filter via a third conduit,
wherein the third conduit is fluidly connected to a hydrogen control assembly, wherein the hydrogen control assembly monitors gas mixtures within the dynamoelectric machine, and based on monitored gas mixture results the hydrogen control assembly provides a means for setting a scavenging rate of gas from the component.

11. The hydrogen cooled dynamoelectric machine of claim 10, further comprising:
a first valve connected between the component of the dynamoelectric machine and the hydrogen control assembly, and
a second valve connected between the filter and the hydrogen control assembly.

12. The hydrogen cooled dynamoelectric machine of claim 11, wherein the component of the dynamoelectric machine is chosen from at least one of the group comprising:
a generator and a seal oil drain enlargement.

13. The hydrogen cooled dynamoelectric machine of claim 10, wherein the dynamoelectric machine is at least one of a generator and a motor, and the component of the dynamoelectric machine is chosen from at least one of a generator and a seal oil drain enlargement.

14. A filter system for a hydrogen cooled generator, the filter system comprising:
a float trap fluidly connected to a component of the hydrogen cooled generator via a first downwardly sloped scavenging conduit, the component chosen from at least one of a generator and a seal oil drain enlargement;
a coalescing filter fluidly connected to the float trap via a second scavenging conduit, the coalescing filter configured to permit passage of gaseous flow while limiting liquid flow;
a flow switch fluidly connected to the coalescing filter via a third scavenging conduit, the flow switch configured to monitor flow through the third scavenging conduit; and
wherein the third scavenging conduit is fluidly connected to a hydrogen control assembly, the hydrogen control assembly monitors gas mixtures within the dynamoelectric machine, and based on monitored gas mixture results the hydrogen control assembly provides a means for setting a scavenging rate of gas from the component, and wherein a valve connected between the component and the hydrogen control assembly is configured for adjusting the scavenging rate.

15. The filter system of claim 14, the liquid flow comprising oil.

16. The filter system of claim 14, further comprising at least one valve fluidly connected to the float trap and a drain.

17. The filter system of claim 14, wherein the hydrogen control assembly is configured to monitor gas mixtures within the generator and the seal oil drain enlargement.

* * * * *